(12) United States Patent  
Srinivasan et al.

(10) Patent No.: US 10,742,567 B2  
(45) Date of Patent: Aug. 11, 2020

(54) PRESCRIPTIVE ANALYTICS BASED STORAGE CLASS PLACEMENT STACK FOR CLOUD COMPUTING

(71) Applicant: Accenture Global Solutions Limited, Dublin (IE)

(72) Inventors: Madhan Kumar Srinivasan, Bangalore (IN); Arun Purushothaman, Chennai (IN); Guruprasad Pv, Bangalore (IN); Manish Sharma Kolachalam, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 19 days.

(21) Appl. No.: 16/219,435

(22) Filed: Dec. 13, 2018

(65) Prior Publication Data

US 2020/0195571 A1  Jun. 18, 2020

(51) Int. Cl.
*H04L 12/911* (2013.01)
*H04L 29/08* (2006.01)

(52) U.S. Cl.
CPC .......... *H04L 47/70* (2013.01); *H04L 67/1097* (2013.01)

(58) Field of Classification Search
CPC ............................ H04L 47/70; H04L 67/1097
See application file for complete search history.

(56) References Cited

U.S. PATENT DOCUMENTS

| | | | |
|---|---|---|---|
| 8,706,962 B2 | 4/2014 | Belluomini et al. | |
| 9,454,321 B1 | 9/2016 | Smaldone et al. | |
| 10,127,234 B1 | 11/2018 | Krishnan et al. | |
| 10,250,451 B1 * | 4/2019 | Moghe | H04L 41/145 |
| 2012/0102053 A1 | 4/2012 | Barrett et al. | |
| 2014/0214793 A1 * | 7/2014 | Tatemura | G06F 16/2453 707/713 |
| 2014/0325151 A1 | 10/2014 | Kim et al. | |
| 2017/0024144 A1 | 1/2017 | Hrischuk et al. | |

(Continued)

OTHER PUBLICATIONS

U.S. Appl. No. 16/154,174, filed Oct. 8, 2018.

(Continued)

*Primary Examiner* — Arvin Eskandarnia
*Assistant Examiner* — Chhian (Amy) Ling
(74) *Attorney, Agent, or Firm* — Brinks Gilson & Lione

(57) ABSTRACT

A multi-layer storage class placement stack may generate a token containing storage class placement prescriptions for controlling the placement of stored items within a selection of classes for storage. An input layer of the storage class placement stack may generate time-collated activity data based on historical access data, volume metric data, and/or tagging data. The time-collated activity data may include data groupings using timestamps or other timing indicators. A transformation layer may further process the time-collated activity data to generate defined-period summation data that provides summary detail for defined durations across a period of analysis. The defined-period summation data may be used by a prescriptive engine layer to generate prescriptions for placement of individual stored items by associating the prescriptions with storage identifiers for the individual items. Using the prescriptions, the prescriptive engine layer may generate the token to send to a host interface for management of the stored items.

20 Claims, 5 Drawing Sheets

(56) References Cited

U.S. PATENT DOCUMENTS

| | | | |
|---|---|---|---|
| 2017/0262185 A1 | 9/2017 | Long et al. | |
| 2017/0278015 A1* | 9/2017 | Miranda | G06N 20/00 |
| 2018/0260125 A1 | 9/2018 | Botes et al. | |
| 2018/0270132 A1* | 9/2018 | Hashimoto | H04L 41/064 |
| 2019/0079848 A1 | 3/2019 | Srinivasan et al. | |
| 2019/0102719 A1* | 4/2019 | Singh | G06Q 10/06393 |
| 2019/0179675 A1 | 6/2019 | Srinivasan et al. | |
| 2019/0205150 A1 | 7/2019 | Srinivasan et al. | |

OTHER PUBLICATIONS

U.S. Appl. No. 16/285,539, filed Feb. 26, 2019.
U.S. Appl. No. 16/411,064, filed May 13, 2019.
U.S. Appl. No. 16/423,720, filed May 28, 2019.
Examination Report No. 1 for Australia Application No. 2019222940, dated Apr. 25, 2020, 7 pages.
Krishnaswamy, H., 'Machine Learning Based Prescriptive Analytics for data Center Networks', Jun. 15, 2016, [online] [retrieved from internet on Apr. 23, 2020] <URL: https://www.snia.org/educational-library/machine-learning-based-prescriptive-analytics-data-center-networks-2016>, 3 pages.
Karakoyunlu, C. et al., 'Exploiting user metadata for energy-aware node allocation in a cloud storage system', Journal of Computer and System Sciences, vol. 82, No. 2, Mar. 2016, pp. 282-309.
Extended European Search Report in Europe Application No. 19198107.5, dated Apr. 20, 2020, 15 pages.
Barr, "New—Automatic Cost Optimization for Amazon S3 via Intelligent Tiering | AWS News Blog", dated Nov. 26, 2018, obtained from the Internet at URL: <https://aws.amazon.com/blogs/aws/new-automatic-cost-optimization-for-amazon-s3-via-intelligent-tiering/> retrieved on Apr. 6, 2020, 7 pages.
Anonymous, "FAST Theory and Best Practices for Planning and Performance Technical Notes" dated May 31, 2010, XP055683466, obtained from the Internet at URL: <https://www.dellemc.com/en-us/collaterals/unauth/technical-guides-support-information/products/storage-4/docu9318.pdf> retrieved on Apr. 6, 2020, 45 pages.

* cited by examiner

PRESCRIPTIVE ANALYTICS BASED STORAGE CLASS PLACEMENT STACK FOR CLOUD COMPUTING

TECHNICAL FIELD

This disclosure relates to storage class placement via a prescriptive analytics based storage class placement stack.

BACKGROUND

Rapid advances in communications and storage technologies, driven by immense customer demand, have resulted in widespread adoption of cloud systems for managing large data payloads, distributed computing, and record systems. As one example, modern enterprise systems, for example those relying on object storage architectures, presently maintain data records many petabytes in size in the cloud. Improvements in tools for cloud resource allocation and consumption prediction will further enhance the capabilities of cloud computing systems.

DETAILED DESCRIPTION

Figure 1:
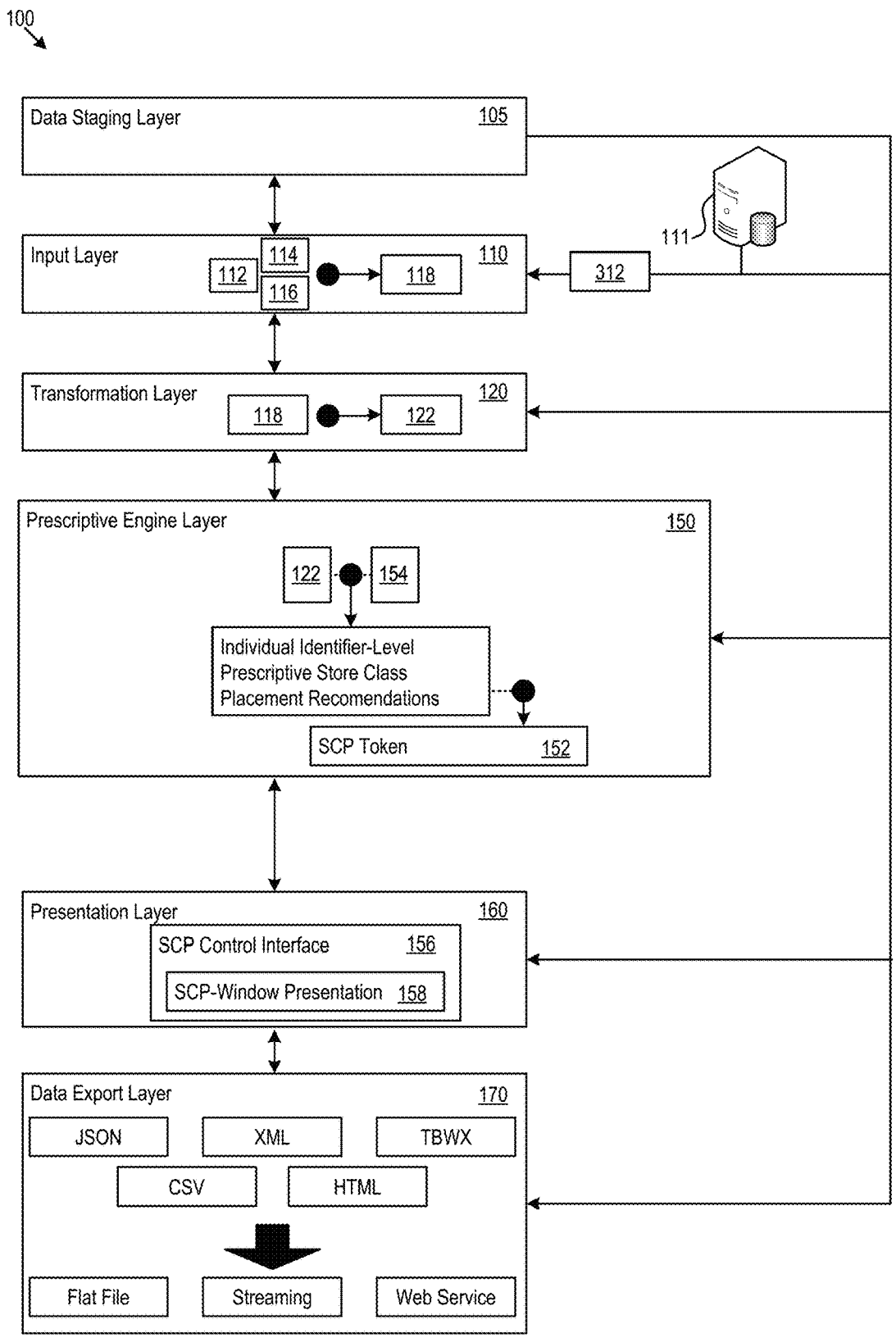
FIG. 1 shows an example multiple-layer storage class placement stack.

In various systems, storage solutions such as object or block storage may utilized by various applications (e.g., local applications, web applications, clients, and/or other applications) and/or hardware components to support operations and provide general data storage. The various applications and/or hardware components may access stored items (e.g., block storage contents, objects, data buckets, or other data storage on machine-readable media). In some cases, stored items may be assigned a storage class. The storage may correspond to a particular consumption metric associated with accessing the stored item. For example, consumption may be tied to amounts of data transferred when accessing storage. Different storage classes may be associated with different consumption metrics (e.g., different consumption rates and/or different idle consumption). In a constrained consumption system, the selection of a storage class placement that provides efficient consumption while meeting the access profile of the system allow for allocation of consumable resources to other computing performance concerns within the constrained system. For example, idle access resource consumption associated with a storage class that is too high for a particular stored item may reduce access resources that may be available for other stored items, e.g., to increase their storage classes or acquire dynamic access resources. In other words, a storage class with access allocations that are efficiently utilized may lead to technical improvements in the performance of the underlying hardware of the constrained system. Further, insufficiently high storage classifications for stored items may lead to increased reliance on dynamic access resources which may exceed the consumption associated with idle access resource consumption associated with higher storage classes. Deliberate selection of storage class placements may ensure an accurate level of utilization of access resources rather than an inaccurate reliance on requests for dynamic resources or over-reliance on high storage classes with comparatively high idle resource consumption. Balancing the usage of lower and higher storage classes for such stored items may lead to comparatively efficient consumption profiles thereby maximizing the access resources that can be obtained for a given resource pool. In cases where storage classes are haphazardly selected, uncertainty may lead to poorly matched class selections, which in turn, may lead to undue consumption profile, insufficient storage resources, and/or service interruption/delays (e.g., degradation in the performance of the underlying hardware).

Accordingly, increased storage class placement selection accuracy provides a technical solution to the technical problem of system inefficiency by increasing the utilization and storage item access resources (both idle and dynamically requested) for given consumable resource inputs. The storage class placement (SCP) stack techniques and architectures described below may be used to accurately prescribe storage class placement recommendations based on analysis of data associated with the stored items. Further, the analysis may include historical access data sources such as, utilization data, file modification history, get/put data or other historical access data; and volume metric data, such as file sizes, transferred data sizes, expenditure report data for idle storage of and accessing stored item, consumption metric data. The analysis may also include topological or relationship data, tagging data, durability and availability data, or other metadata. Thus, a SCP stack may provide prescriptive storage class placement taking into account resource utilization patterns, storage classes, stored item availability, stored item durability, consumption metric data, workload and topological data, geographic data, and/or other data. Thus, the disclosed SCP stack techniques and architectures improve the operation of the underlying hardware by increasing computing efficiency and provide an improvement over existing solutions.

The SCP stack may analyze historical access data, tagging data and volume metric data to predict future access and produce prescriptive recommendations. historical access data, may include, for example, historical data related to usage or activation of stored items, e.g., storage history, get and put data, listings of previous file access, object storage bucket activity (e.g., machine-learning based bucket activity) application access schedules, application dependencies, processor activity, memory usage history, seasonal usage cycles e.g., holiday schedules, daily usage cycles, weekly usage cycles, quarterly usage cycles or other data. Tagging data may include stored item specific data. For example, tagging data may include data provided by an operator, provisioning or configuration management system, or an analyzed system detailing functional groupings (e.g., project-specific allocations, file durability, file availability requirements, stored items marked for a specific purposes, availability zones, operating systems applications, installed software, or other groupings), quality of service requirements, minimum classes, or other tagging data. Consumption metric data may include computing resource specific cost metrics such as expenditure-per-access, expenditure-per-transferred-byte, expenditure-for-idle-storage-time, or resource-per-time metrics.

FIG. 1 shows an example multiple layer SCP stack 100. In this example, the SCP stack 100 includes a data-staging layer 105, an input layer 110, a transformation layer 120, a prescriptive engine layer 150, a presentation layer 160, and a data export layer 170. The SCP stack 100 may include a multiple-layer computing structure of hardware and/or software that may provide prescriptive analytical recommendations (e.g., storage class placement prescriptions) through data analysis.

In some implementations, as discussed below, Intelligent Cloud Storage Class Selection Advisor developed by Accenture® Bangalore may be operated as the SCP stack 100. In various implementations, the SCP stack 100 may be used to prescribe storage classes on various object storage system such as Amazon Web Services (AWS) Simple Cloud Storage Service (S3), Cloudian®, Dell EMC®, Microsoft Azure®, or other object storage solutions. In cases where storage providers do not necessarily offer differentiated storage classes among its service offerings (e.g., the provider offers a single class or class is tied to storage size), the storage provider may be used within a class placement system as a single class among other classes provided by other storage providers.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the SCP stack 100, the data-staging layer 105 may provide the input layer 110 with storage resources to store ingested a data within a database or other data structure. Hence, the data-staging layer 105 may provide a hardware resource, e.g., memory storage resources, to the input layer 110. Accordingly, the multiple-layer stack architecture of the SCP stack 100 may improve the functioning of the underlying hardware.

Figure 2:
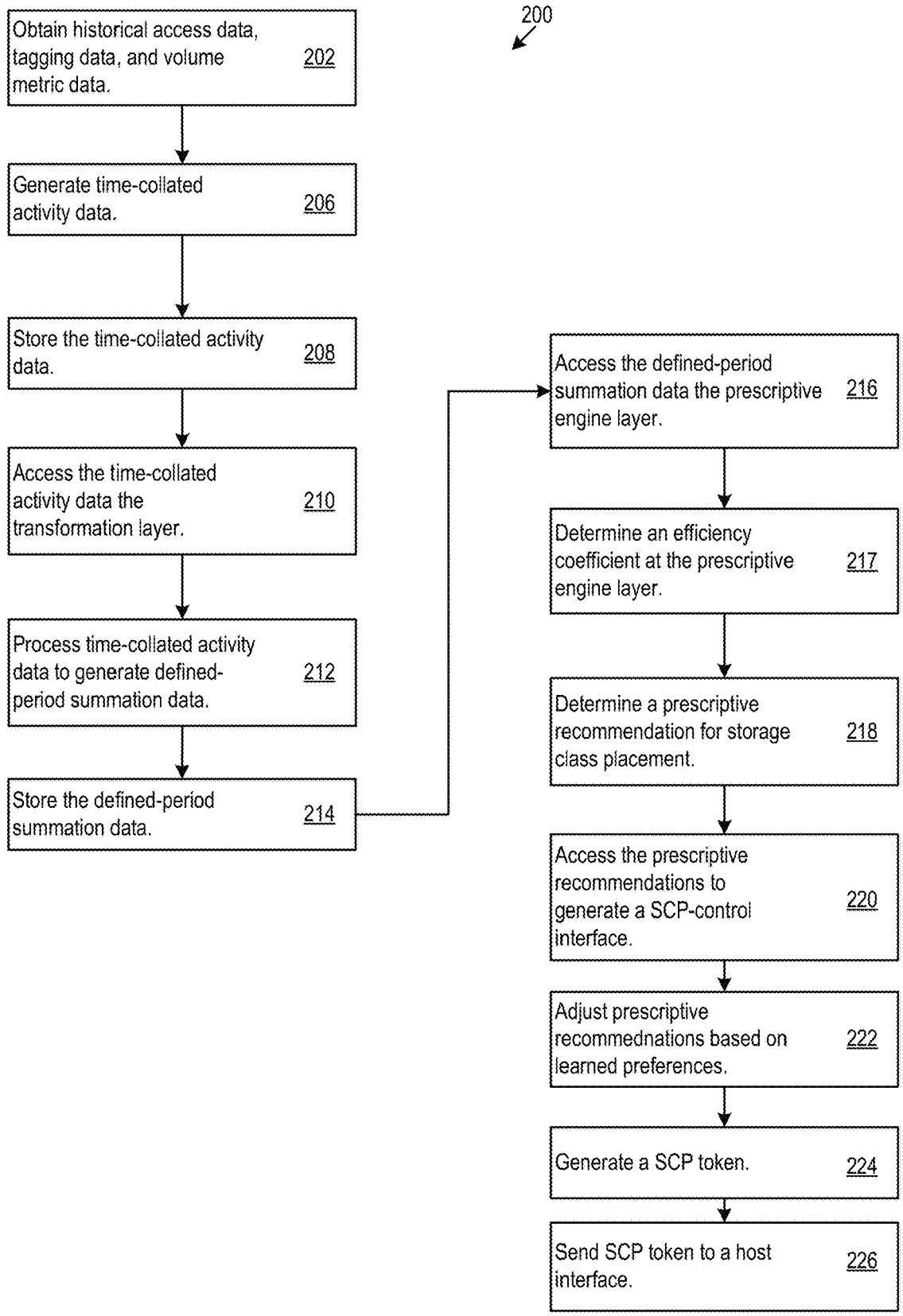
FIG. 2 shows example storage class placement logic.

In the following, reference is made to FIG. 1 and the corresponding example SCP logic (SPL) 200 in FIG. 2. The logical features of SPL 200 may be implemented in various orders and combinations. For example, in a first implementation, one or more features may be omitted or reordered with respect to a second implementation. At the input layer 110 of the SCP stack 100, the SPL 200 may obtain historical access data 112, volume metric data 114, and tagging data 116 (202). In some cases, the historical access data 112, volume metric data 114, and tagging data 116 may be received via communication interfaces (e.g., communication interfaces 312, discussed below). The historical access data 112, volume metric data 114, and tagging data 116 may be accessed at least in part, e.g., via the communication interfaces 312, from data sources 111, which may include, cloud compute utilization databases, cloud expenditure databases, master virtual machine cost databases, access history databases, object storage description data, infrastructure/project tags or other data sources.

The input layer 110 may process the historical access data to generate time-collated activity data 118 (206). Time-collated activity data may refer to historical access data and volume metric data that have been aggregated and associated with identifiers for particular stored items. Accordingly, time-collated data may provide a mapping of, for example, access and transfer volumes for a selected stored item. Additionally or alternatively, time-collated activity data may be mapped to timestamps allowing am accurate time window of access and/or volume/consumption data.

The input layer 110 then may store the time-collated activity data 118 via a memory operation at the data-staging layer 105 (208).

After the time-collated activity data 118 is generated and stored, the transformation layer 120 may access the time-collated activity data 118 using memory resources passed from the data-staging layer 105 (210, e.g., memory access resources). The transformation layer 120 may process the time-collated activity data to generate defined-period summation data 122 (212). Defined-period summation 122 data may refer consumption/access/volume summations for particular stored items over pre-defined durations. For example, the pre-defined durations may include a default time period such as a day, a week, a month, or other defined duration. The defined-period may be specified according to an administrator preference, an analytic analysis granularity, available data granularity, a dynamically defined-duration (e.g., defined once for every defined number of iterative analysis cycles), or other parameters.

The transformation layer 120 may store the defined-period summation data 122 via memory operations at the data-staging layer 105 (214).

The prescriptive engine layer 150 may access the defined-period summation data to determine an efficiency coefficient associated with selection of the particular storage classes available to the system (216). Storage classes may offer differing consumption rates for idle storage and access activities. For example, AWS offer multiple storage classes include S3 Standard, S3 Infrequent Access; S3 Infrequent Access One Zone; S3 Glacier. In the example, S3 standard has the highest idle storage consumption rate paired with a zero consumption rate for access activities. The other storage classes offer lower idle storage consumption rates but have non-zero consumption rates for access activities. Accordingly, data that is stored and left un-accessed for long periods (e.g., days, weeks, months, years, or other extended periods) may have lower associated consumption when stored in accord with a class other than S3 Standard, which offers no consumption reduction for comparatively low access activity. Conversely, in the example, S3 Glacier offers the largest potential consumption reduction for idle storage. However, in the example, S3 Glacier is paired with the highest rates for access activities. Accordingly, a comparatively dormant stored item may be stored efficiently on Glacier (e.g., the lowest class) while a comparatively active stored item may be efficiently stored on Standard (e.g., the highest class). Data with intermediate access activity may be stored efficiently on Infrequent Access or similar (e.g., middle storage classes—neither the lowest nor the highest).

Across multiple services (e.g., AWS S3, Cloudian®, Dell EMC®, Microsoft Azure®) classes may be ranked in accord with consumption. Higher classes may have lower consumption rates for access activities (e.g., the consumption rate that is applied when the stored item is accessed) and higher idle storage consumption rates (e.g., the consumption rate that is applied whether or not the stored item is accessed). Conversely, lower classes may have higher consumption rates for access activities and lower idle storage consumption rates. Hence, classes may be ranked across a mixed service prescriptive recommendation environment.

In various implementations, the prescriptive engine layer 150 may apply analytic processing to determine the efficiency coefficient based on the defined-period summation data (217). The prescriptive engine layer 150 may iterate over identifiers (e.g., storage identifiers) for the individual stored items in the analysis. For the iterative process, prescriptive engine layer 150 may access defined-period summation data for the individual stored items as the prescriptive engine layer 150 performs the iteration for the corresponding identifier. In an illustrative example, the prescriptive engine layer 150 may implement the example routine in Table 1 to determine efficiency coefficients for placement of a stored item among one or more storage classes, e.g., in this illustrative example using classes from AWS S3). The prescriptive engine layer 150 may generate recommendations based on the efficiency coefficient by comparing the efficiency coefficient to a threshold. Additionally or alternatively, the prescriptive engine layer 150 may generate recommendations by comparing the efficiency coefficient for a particular class to that of another class or classes.

TABLE 1

Example Routine for Determination of Efficiency Coefficient
Description

| | |
|---|---|
| Example Routine | UTILIZATION AND COST DATA:<br>    FOR EACH UNIQUE STORED ITEM ID:<br>        FOR EACH DEFINED PERIOD:<br>           CALCULATE {<br>              (STANDARD_CONSUMP =<br>              STD_STORAGE_RATE*USAGEQUANTITY +<br>              STD_PUTS_RATE *USAGEQUANTITY_PUT +<br>              STD_GETS_RATE*USAGEQUANTITY_GET)<br>              (SIA_CONSUMP = SIA_STORAGE_RATE<br>              *USAGEQUANTITY + SIA_PUTS_RATE<br>              *USAGEQUANTITY_PUT + SIA_GETS_RATE<br>              *USAGEQUANTITY_GET +<br>              SIA_DATA_RATE*USAGEQUANTITY_DATA_TRANSFER)<br>              (SIA1Z_CONSUMP = SIA1Z_STORAGE_RATE<br>              *USAGEQUANTITY + SIA1Z_PUTS_RATE<br>              *USAGEQUANTITY_PUT + SIA1Z_GETS_RATE<br>              *USAGEQUANTITY_GET +<br>              SIA_DATA_RATE*USAGEQUANTITY_DATA_TRANSFER)<br>              (RR_CONSUMP =<br>              RR_STORAGE_RATE*USAGEQUANTITY +<br>              RR_PUTS_RATE*USAGEQUANTITY_PUT +<br>              RR_GETS_RATE*USAGEQUANTITY_GET)<br>              (GLACIER_CONSUMP =<br>              GLACIER_STORAGE_RATE*USAGEQUANTITY +<br>              RETRIEVAL_GB_COST*USAGEQUANTITY_GB +<br>              RETRIEVAL_REQUEST_COST*USAGEQUANTITY_REQUEST +<br>              UPLOAD_REQUESTS_COSTS*USAGEQUANTITY_UPLOADS)<br>            }<br>        STANDARD_COEFF = SUM(STANDARD_CONSUMP),<br>        SIA_COEFF = SUM(SIA_CONSUMP),<br>        SIA1Z_COEFF = SUM(SIA1Z_CONSUMP),<br>        RR_COEFF = SUM(RR_CONSUMP),<br>        GLACIER_COEFF = SUM(GLACIER_CONSUMP)<br>        MIN (STANDARD_COEFF, SIA_COEFF, SIA1Z_COEFF, RR_COEFF, GLACIER_COEFF)<br>        OUTPUT PRIMARY CLASS PRESCRIPTION = MIN<br>    END |

[CLASS]_COEFF: Coefficient for [CLASS]

Additionally or alternatively, storage classes from other services may be added to this illustrative example to allow for prescriptive recommendations across multiple services and/or services other than AWS S3.

In cases where complete or partial historical access data may not necessarily be available for a stored item or related stored items (e.g., with a relationship established via tagging data), the prescriptive engine layer may apply alternative analyses to the stored item to determine an efficiency coefficient. The alternative analysis may use volume metric data in conjunction with get/put history, last access history, or other client provided access data to estimate access activity for an analysis period.

In an illustrative example, the prescriptive engine layer 150 may implement the example routine in Table 2 to determine estimated access activity and prescriptive recommendations for stored items with incomplete historical access data. In the example, the historical access data is limited to a history (not necessarily timestamped) of gets and puts for a particular stored item or gets/puts for a relevant related stored items (e.g., as defined by the client).

TABLE 2

Example Routine for Determination of Estimated Efficiency Coefficient
Description

| | |
|---|---|
| Example Routine | PRIMARY RECOMMENDATION DATA:<br>    FOR EACH UNIQUE STORED ITEM ID:<br>        CALCULATE:<br>           GETSBYSTORAGE = RATIO OF GETS TO STORAGE<br>           PUTSBYSTORAGE = RATIO OF PUTS TO STORAGE<br>        DECISION TREE:<br>           ESTIMATED COEFFICIENT = GETSBYSTORAGE + PUTSBYSTORAGE |

TABLE 2-continued

Example Routine for Determination of Estimated Efficiency Coefficient
Description

```
      FRESH INPUT DATA:
          SCORE BASED ON DECISION TREE CUTOFFS
          COMBINED WITH THE PRIMARY
          RECOMMENDATIONS
  END
```

The estimated coefficient may be translated into coefficients for the classes because the ratios of e.g., gets to storage correspond to ratios for active access to idle storage.

Once the coefficients have been determined by the prescriptive engine layer 150, the prescriptive engine layer 150 may determine a prescriptive recommendation via comparison of the coefficients (218). The prescriptive engine layer 150 may output its recommendations as an SCP token 152. The prescriptive engine layer 150 may send the SCP token to a host interface for management of the stored items. For example, a host interface may include and Application Programming Interface (API) for a storage service hosting the stored items. The SCP token may be configured to control the API and assign the recommended classes to the stored items.

Prior to determination of recommendations, the prescriptive engine layer 150 may further access feedback history data 154. The feedback history data 154 may be based on commands previously received from a SCP-control interface 156. The SCP control interface generated by the presentation layer, as discussed below.

A presentation layer 160 may access the prescriptive recommendations from the prescriptive engine layer 150, e.g., via data-staging layer 105 memory operations to generate a SCP-control interface 156 including a SCP-window presentation (220). The SCP-window presentation 158 (as discussed below) may include data and/or selectable options related to the storage class placement prescriptive recommendations. The SCP-window presentation 158 may be configured to display (e.g., to an operator) the prescriptive recommendations of the SCP stack with regard to upcoming stored item placement. Accordingly, an option to forward a SCP token, to a host interface for placing stored item in classes in accord the prescriptions may be included as one of the selectable options available through the SCP-window presentation 158. Additionally or alternatively, the SCP-window presentation may include an option to reject one or more (or all of) the prescriptive recommendations.

Additionally or alternatively, the SCP-window presentation 158 may also include options for the operator to manually adjust the prescriptions. The adjustment options and presentations of prescriptions may be presented at an individual stored item identifier granularity or at higher logical levels. For example, multiple data stored items that individually correspond to individual data stores within a logically associated hierarchy may be presented with individual prescription adjustment controls despite being logically associated. For example, the presentation of a "child" stored item within the SCP presentation may be independent of that of a "parent" stored item within the same logical hierarchy. In some cases, this independence may still be present where the child stored item inherits logical properties (such as security and access properties) from the parent stored item. Further, prescriptive recommendations for such stored items may be independent of one another. Accordingly, a logical storage hierarchy mapped on to the stored items does not necessarily result on group prescriptive recommendations or controls.

Nevertheless, in some implementations, logical associations between stored items may be accounted for in the analysis through treatment of tagging data. For example, robustness (e.g., in-zone redundancy) and/or zone redundancy (or other properties) may be inherited across logical associations and affect prescriptive recommendations made by the prescriptive engine layer. Further, presentation of the recommendations may be made at a group or upper hierarchy level rather than at the individual stored item identifier level.

In some cases, based on past adjustments or commands, e.g., the feedback history, the prescriptive engine layer 150 may adjust the prescriptive recommendations to better conform to learned operator preferences, e.g., by predicting adjustments likely to be implemented by the operator (222). In some implementations, classification machine learning techniques, such as decision trees, may be implemented to support the feedback-bases prescriptive recommendation adjustments.

Additionally or alternatively, the SCP-window presentation may include selectable options for data robustness and multiple-zone redundancy. The selectable options may be provided at an individual stored-item identifier granularity. Accordingly, options for data robustness and multiple-zone redundancy may be provided for individual data stored items in cases where those individual stored items are logically related to other stored items. Nevertheless, in some cases, options for data robustness and multiple-zone redundancy may be provided for logical groupings and/or hierarchies and the granularity level may be selected to be above the individual stored-item identifier level.

After analysis and presentation of the SCP-control interface, the prescriptive engine layer may generate an SCP token based on the operator input and the prescriptive recommendations (224).

In various implementations, the length of the prescribed period may be designated by the system. The accuracy prediction of demand over the prescribed period may be dependent on the length of historical access data used. In some implementations, a pre-defined duration of historical access data may be used. For example, a 90-day period may be used. In various systems, various durations may be used. In some examples, one week, one month, three months, one year, or other durations may be used. In some cases, a target operator acceptance rate for prescriptive recommendations may influence selection of the duration. For example, if an operator rejects too many recommendations (e.g., above a threshold level), the analysis period may be increased. Conversely, the duration may be decreased (to reduce computational intensity for the analysis) if the operator rejects too few (e.g., below a threshold level).

After generation of the SCP token 152, the SPL 200 may initiate deployment of the SCP token 152 by causing network interface circuitry (e.g., the communication interfaces 312) to send the SCP token 152 to a host interface for stored item management (226). For example, services such as Amazon® Web Services (AWS), Cloudian®, Microsoft® Azure, or other cloud computing services, may maintain host interfaces (e.g., web interfaces, application programming interfaces, or other interfaces) by which clients may manage stored items. The SPL 200 may also use a scheduling proxy system that uses the SCP token data to maintain stored item class placement, calling the service provider's application programming interfaces for each placement control action defined by the SCP token.

In some cases, the SPL 200 may initiate deployment via the data export layer 170. The data export layer 170 may format the reservation matrix in one or more formats for transfer. For example, the data export layer 170 may support format translation to java script object notation (JSON), eXtensible markup language (XML), comma separated value (CSV), Tableau Workbook (TBWX), hypertext markup language (HTML) or other formats. The data export layer 170 may also support transfer of the SCP token in one or more states, such as flat file transfers, streaming transfers, web service access, internet protocol transfers, or other transfers.

Additionally or alternatively, the SPL 200 may initiate deployment via the prescriptive engine layer 150 through direct transfer, direct network access, or other non-export transfer.

Figure 3:
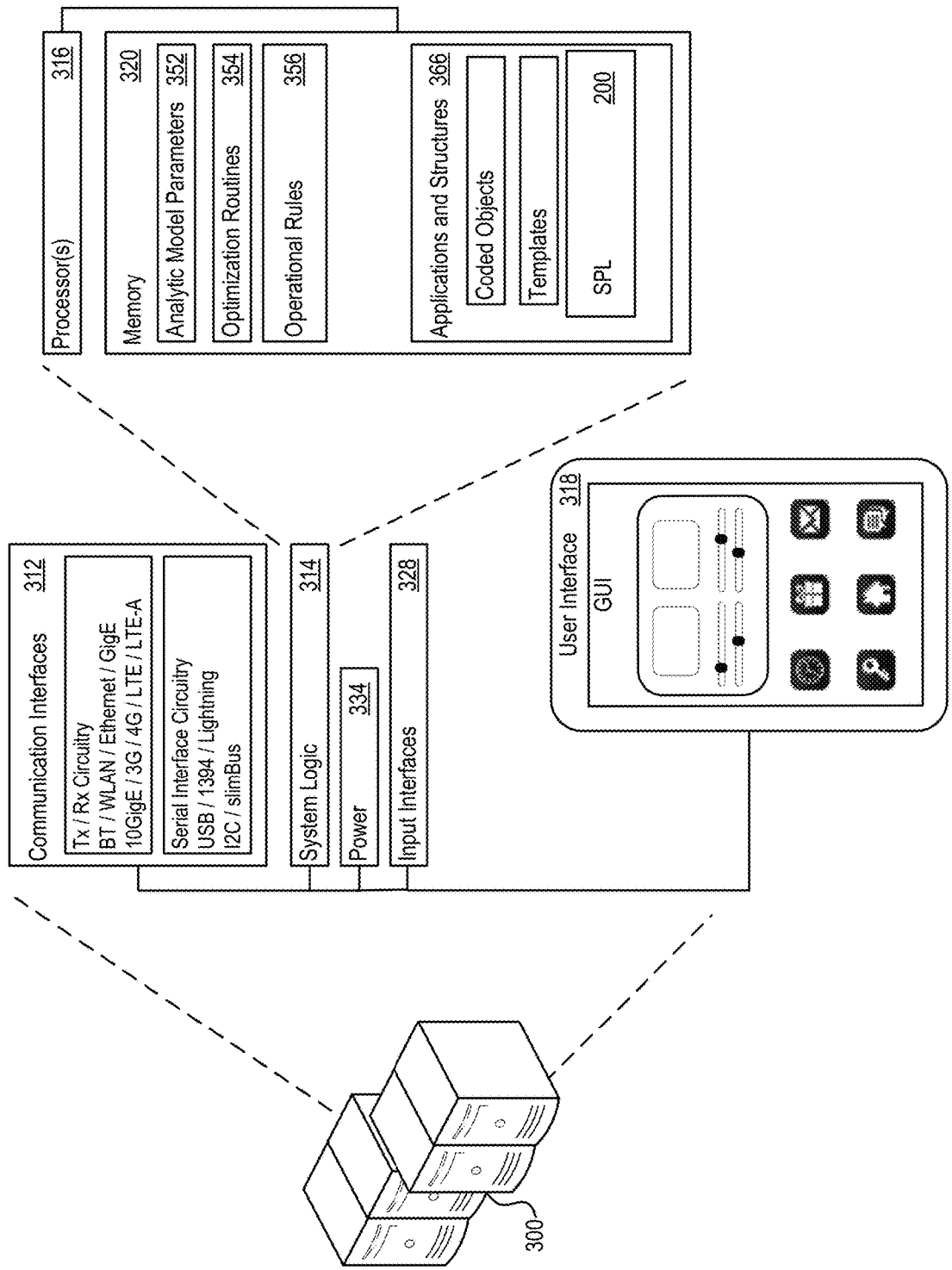
FIG. 3 shows an example specific execution environment for the storage class placement stack of FIG. 1.

FIG. 3 shows an example specific execution environment 300 for the SCP stack 100 described above. The execution environment 300 may include system logic 314 to support execution of the multiple layers of SCP stack 100 described above. The system logic may include processors 316, memory 320, and/or other circuitry.

The memory 320 may include analytic model parameters 352, optimization routines 354, and operational rules 356. The memory 320 may further include applications and structures 366, for example, coded objects, machine instructions, templates, or other structures to support generation of time-collated data, processing to generate defined-period summation data, or other tasks described above. The applications and structures may implement the SPL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, $I^2C$, slimBus, or other serial interfaces. The communication interfaces 312 may be used to support and/or implement remote operation of the SCP-control interface 156. The execution environment 300 may include power functions 334 and various input interfaces 328. The execution environment may also include a user interface 318 that may include human-to-machine interface devices and/or graphical user interfaces (GUI). The user interface 318 may be used to support and/or implement local operation of the SCP-control interface 156. In various implementations, the system logic 314 may be distributed over one or more physical servers, be implemented as one or more virtual machines, be implemented in container environments such as Cloud Foundry or Docker, and/or be implemented in Serverless (functions as-a-Service) environments.

In some cases, the execution environment 300 may be a specially defined computational system deployed in a cloud platform. In some cases, the parameters defining the execution environment may be specified in a manifest for cloud deployment. The manifest may be used by an operator to requisition cloud based hardware resources, and then deploy the software components, for example, the SCP stack 100, of the execution environment onto the hardware resources. In some cases, a manifest may be stored as a preference file such as a YAML (yet another mark-up language), JSON, or other preference file type. Additionally or alternatively, the manifest may include custom scripts to implement the SCP stack 100 in a serverless environment, for example, using the multiple-tier multiple-node serverless framework described in U.S. patent application Ser. No. 16/159,399, filed 12 Oct. 2018, and entitled Distributed Multiple Tier Multi-Node Serverless Framework for Complex Analytics Task Execution, which is incorporated by reference herein in its entirety. Therein, a multiple-tier framework is described. The framework describes a series of the serverless tasks controlled via scripts. The serverless tasks overlap in execution to maintain continuity across the tasks. The computational task in divided into chunks that may be handled by individual serverless tasks. Accordingly, a complex analytic process, such as those describe in this disclosure, may be divided into chunks and executed over one or more overlapping serverless tasks.

Figure 4:
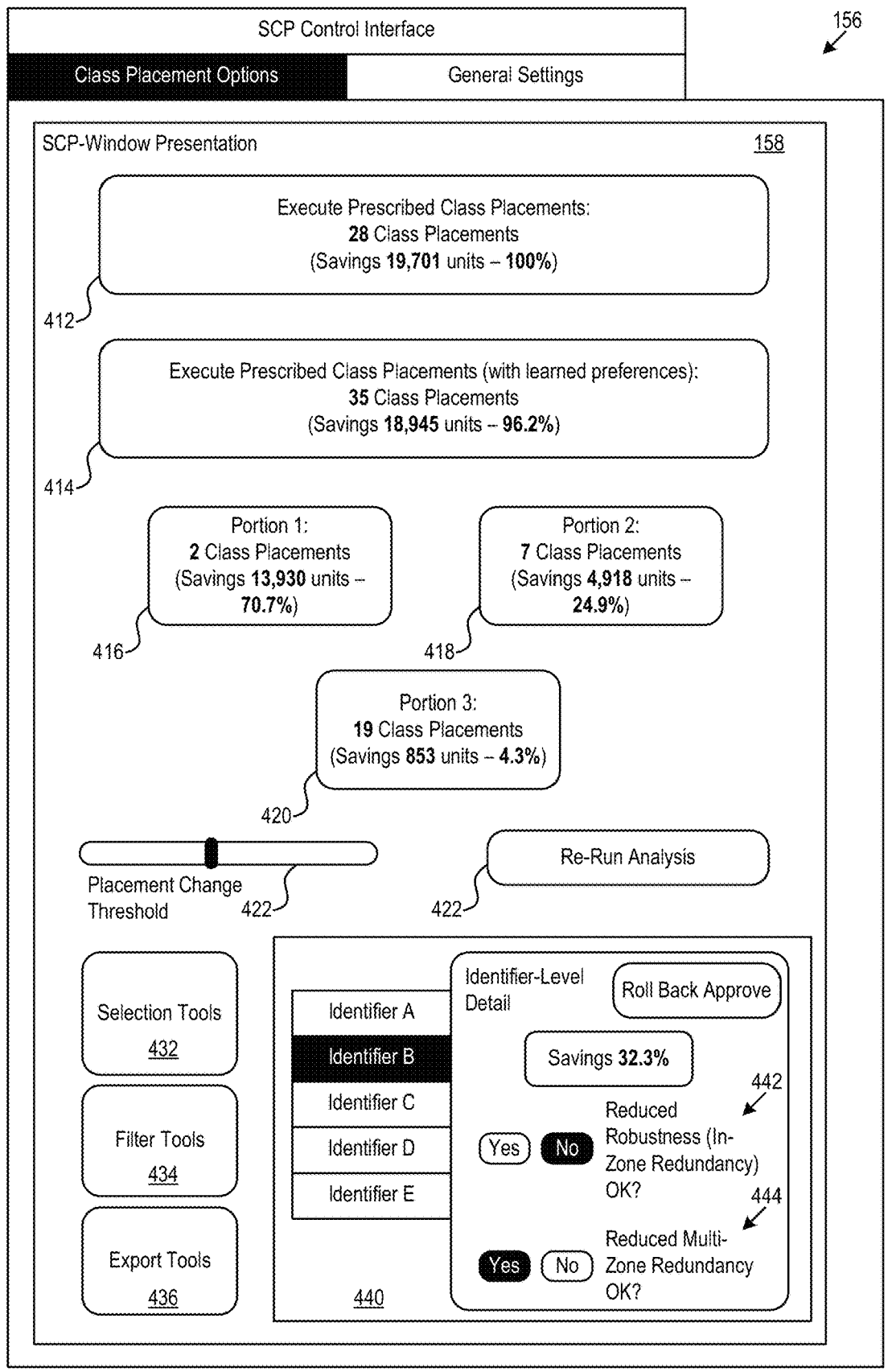
FIG. 4 shows an example storage class placement control interface.

Referring now to FIG. 4, an example SCP-control interface 156 is shown. The SCP-control interface 156 includes an example SCP-window presentation 158 as discussed above. The SCP-window presentation 158 may include multiple selectable options 412, 414, 416, 418, 420, 422 and data regarding the stored item class placement prescriptions, e.g., after adjustment to accommodate the learned preferences of the operator. In this example scenario, the selectable options may include an option 412 to implement the un-adjusted stored item class placement prescriptions, an option 414 to implement the stored item class placement prescriptions with the adjustments based on learned preferences, options 416, 418, 420 to implement augments to selected subsets of the computing resources, options 422 to adjust preferences (e.g., consumption thresholds for altering placements, or other preferences) and re-run the iterative placement analysis at the prescriptive engine layer 150, or other selectable options to control the eventual reservation matrix output.

Additionally or alternatively, the SCP-window presentation 158 may include selection and filter tools 432, 434 to support granular manipulation (e.g., in some cases, down to individual identifiers for individual stored items or at logical groups levels containing multiple identifiers). The SCP-window presentation 158 may also include export tools 436 for management of data export layer 170 operations.

The SCP-window presentation may further include an identifier-level detail panel 440 with selectable options 442, 444 allowing the operator to define selections for data robustness 442 and data redundancy over multiple zones. In the illustrative example context of AWS S3 services, the selectable option 442 may allow/disallow placement in a Reduced Redundancy S3 Infrequent Access class and option 444 may allow/disallow placement in S3 Infrequent Access One-Zone class. In some implementations, initial values for these options may be gleaned from tagging data.

In the example, shown in FIG. 4, the options 416, 418, 420 allow for manipulation of selected subsets of stored items using the selection and filter tools 432, 434. The options 416, 418, 420 show the respective portions of the total consumption savings that may be achieved by adjusting each specific subset of the store items. In the example, the first subset option 416 provides the greatest marginal consumption savings, while the options 418, 420 provide successively smaller marginal consumption savings.

Figure 5:
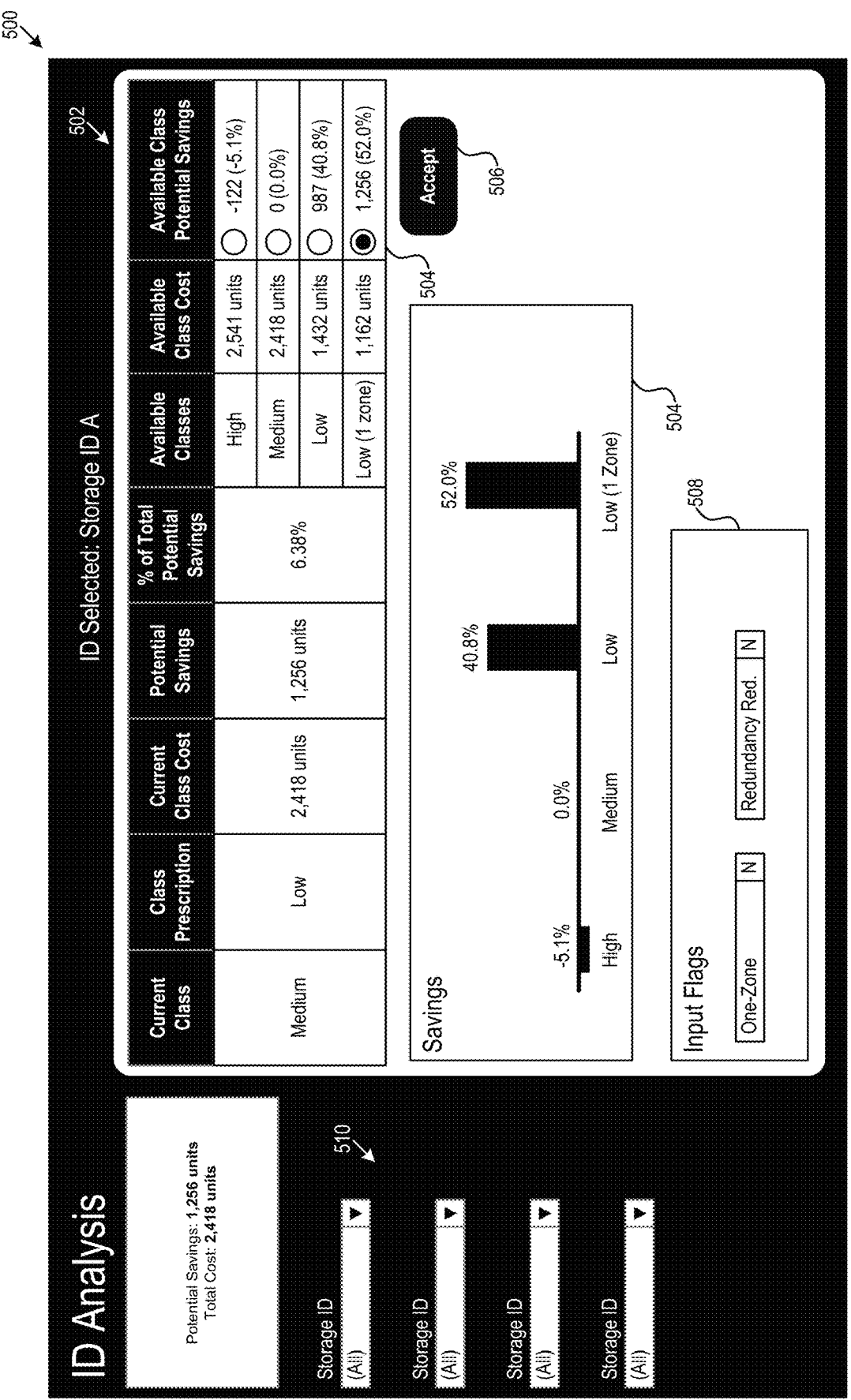
FIG. 5 shows a second example storage class placement control interface.

FIG. 5 shows a second example SCP-control interface 500. In the second example SCP-control interface 500, the SCP-window presentation 502 is storage ID specific. The SCP-window presentation 502 provides detail panels 504 with regard to consumption savings for the selected storage identifier (storage ID). Selections based on user preferences may be made within the detail panels 504. The SCP-window presentation 502 may further include options 506 for confirm user selections. The SCP-window presentation 502 may further include selectable options (in this example, input flags 508) to control data robustness, region inclusion, and redundancy. The SCP-control interface 500 may further include tools 510 for filtering and selecting storage identifiers for detail display within the example SCP-window presentation 502.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a system comprises: a system includes: network interface circuitry configured to: receive historical access data for a selected stored item; receive volume metric data for the selected stored item; send a storage class placement (SCP) token to a host interface, the host interface configured to control storage class placement for at least the selected stored item; placement circuitry in data communication with the network interface circuitry, the placement circuitry configured to execute a SCP stack, the SCP stack including: a data staging layer; an input layer; a transformation layer; and a prescriptive engine layer; the SCP stack executable to: obtain, via the input layer, the historical access data, and the volume metric data; process, at the input layer, the historical access data and volume metric to generate time-collated activity data; store, at the data staging layer, the time-collated activity data; process, at the transformation layer, the time-collated activity data to generate defined-period summation data; store, at the data staging layer, the defined-period summation data; access, at the prescriptive engine layer, the defined-period summation data via a memory resource provided by the data staging layer; based on the defined-period summation data, determine, at the prescriptive engine layer, an efficiency coefficient for a placement selection associated with a selected storage class for the selected stored item; based on the efficiency coefficient, perform a class determination whether to execute the placement selection; and based on the class determination, generate the SCP token.

A2 The system of example A1, where: the SCP stack is further executable to, at a presentation layer, generate a SCP control interface including a SCP-window presentation; and the SCP-window presentation includes a selectable option to execute a placement selection.

A3 The system of example A2, where the placement selection is grouped within the SCP-window presentation with other placement selections each corresponding to efficiency coefficients within a pre-defined range.

A4 The system of either of examples A2 or A3, where the SCP-window presentation further includes a selectable option to reject execution of the placement selection.

A5 The system of any of examples A2-A4, where the SCP-window presentation is configured to display multiple placement selections each with a corresponding efficiency coefficient for the selected stored item.

A6 The system of any of examples A1-A5, where the placement circuitry is configured to perform the class determination by comparing the efficiency coefficient to a threshold.

A7 The system of any of examples A1-A6, where the historical access data includes at least 90 days of historical access data for the selected stored item.

A8 The system of any of examples A1-A7, where the selected stored item is associated with a storage identifier.

A9 The system of any of examples A1-A8, where the placement circuitry is configured to determine the efficiency coefficient by iteratively analyzing, in accord with corresponding storage identifiers, defined-period summation data for multiple stored items including the selected stored item.

A10 The system of any of examples A1-A9, where the placement circuitry is configured to determine the efficiency coefficient based on a feedback history generated using previous command inputs from a SCP control interface generated at a presentation layer of the SCP stack.

B1 In an example a method includes: at network interface circuitry: receiving historical access data for a selected stored item; and receiving volume metric data for the selected stored item; at placement circuitry in data communication with the network interface circuitry, the placement circuitry executing a storage class placement (SCP) stack: obtaining, via an input layer of the SCP stack, the historical access data, and the volume metric data; processing, at the input layer, the historical access data and volume metric to generate time-collated activity data; storing, at a data staging layer of the SCP stack, the time-collated activity data; processing, at a transformation layer of the SCP stack, the time-collated activity data to generate defined-period summation data; storing, at the data staging layer, the defined-period summation data; accessing, at a prescriptive engine layer of the SCP stack, the defined-period summation data via a memory resource provided by the data staging layer; based on the defined-period summation data, determining, at the prescriptive engine layer, an efficiency coefficient for a storage class for the selected stored item; based on the efficiency coefficient, performing a class determination whether to place the selected stored item within the storage class; and based on the class determination, generating, at the prescriptive engine layer, an SCP token; and sending, via network interface circuitry, the SCP token to a host interface configured to control storage class placement for at least the selected stored item.

B2 The method of example B1, where performing the class determination includes comparing the efficiency coefficient to a threshold.

B3 The method of either of examples B1 or B2, where the selected stored item is associated with a storage identifier.

B4 The method of any of examples B1-B3, determining the efficiency coefficient includes iteratively analyzing, in accord with corresponding storage identifiers, defined-period summation data for multiple stored items including the selected stored item.

B5 The method of any of examples B1-B4, where determining the efficiency coefficient includes determining the efficiency coefficient based on a feedback history generated using previous command inputs from a SCP control interface generated at a presentation layer of the SCP stack.

C1 In an example, a product includes: machine-readable media other than a transitory signal; and instructions stored on the machine-readable media, the instructions configured to, when executed, cause a machine to: at network interface circuitry: receive historical access data for a selected stored item; and receive volume metric data for the selected stored item; at placement circuitry in data communication with the network interface circuitry, the placement circuitry executing a storage class placement (SCP) stack: obtain, via an input layer of the SCP stack, the historical access data, and the volume metric data; process, at the input layer, the historical access data and volume metric to generate time-collated activity data; store, at a data staging layer of the SCP stack, the time-collated activity data; process, at a transformation layer of the SCP stack, the time-collated activity data to generate defined-period summation data; store, at the data staging layer, the defined-period summation data; access, at a prescriptive engine layer of the SCP stack, the defined-period summation data via a memory resource provided by the data staging layer; based on the defined-period summation data, determine, at the prescriptive engine layer, an efficiency coefficient for a storage class for the selected stored item; based on the efficiency coefficient, perform a class determination whether to place the selected stored item within the storage class; and based on the class determination, generate, at the prescriptive engine layer, an SCP token; and send, via network interface circuitry, the SCP token to a host interface configured to control storage class placement for at least the selected stored item.

C2 The product of example C1, where: the instructions are further configured to cause the machine to, at a presentation layer of the SCP stack, generate a SCP control interface including a SCP-window presentation; and the SCP-window presentation includes a selectable option to execute a placement selection.

C3 The product of example C2, where the placement selection is grouped within the SCP-window presentation with other placement selections each corresponding to efficiency coefficients within a pre-defined range.

C4 The product of either of examples C2 or C3, where the SCP-window presentation further includes a selectable option to reject execution of the placement selection.

C5 The product of any of examples C2-C4, where the SCP-window presentation is configured to display multiple placement selections each with a corresponding efficiency coefficient for the selected stored item.

D1 A method implemented by operation of a system of any of examples A1-A10.

E1 A product comprising instructions stored on a machine readable medium, the instructions configured to cause a machine to implement the method of example D1.

Various implementations have been specifically described. However, many other implementations are also possible.

What is claimed is:

1. A system including:
network interface circuitry configured to:
receive historical access data for a selected stored item;
receive volume metric data for the selected stored item;
send a storage class placement (SCP) token to a host interface, the host interface configured to control storage class placement for at least the selected stored item;
placement circuitry in data communication with the network interface circuitry, the placement circuitry configured to execute a SCP stack,
the SCP stack including:
a data-staging layer;
an input layer;
a transformation layer; and
a prescriptive engine layer;
the SCP stack executable to:
obtain, via the input layer, the historical access data, and the volume metric data;
process, at the input layer, the historical access data and volume metric data to generate time-collated activity data over a historical analysis time-window;
store, at the data-staging layer, the time-collated activity data;
process, at the transformation layer, the time-collated activity data to generate defined-period summation data that includes a series of summations spanning the historical analysis time-window, the summations for durations equal to a defined-period;
store, at the data-staging layer, the defined-period summation data;
access, at the prescriptive engine layer, the defined-period summation data via a memory resource provided by the data-staging layer;

based on the defined-period summation data, determine, at the prescriptive engine layer, an efficiency coefficient for a placement selection associated with a selected storage class for the selected stored item;
based on the efficiency coefficient, perform a class determination whether to execute the placement selection by comparing the efficiency coefficient to other efficiency coefficients for the selected stored item; and
based on the class determination, generate the SCP token.

2. The system of claim 1, where:
the SCP stack is further executable to, at a presentation layer, generate a SCP control interface including a SCP-window presentation; and
the SCP-window presentation includes a selectable option to execute a placement selection.

3. The system of claim 2, where the placement selection is grouped within the SCP-window presentation with other placement selections each corresponding to efficiency coefficients within a pre-defined range.

4. The system of claim 2, where the SCP-window presentation further includes a selectable option to reject execution of the placement selection.

5. The system of claim 2, where the SCP-window presentation is configured to display multiple placement selections each with a corresponding efficiency coefficient for the selected stored item.

6. The system of claim 1, where the placement circuitry is configured to perform the class determination by comparing the efficiency coefficient to a threshold.

7. The system of claim 1, where the historical access data includes at least 90 days of historical access data for the selected stored item.

8. The system of claim 1, where the selected stored item is associated with a storage identifier.

9. The system of claim 1, where the placement circuitry is configured to determine the efficiency coefficient by iteratively analyzing, in accord with corresponding storage identifiers, defined-period summation data for multiple stored items including the selected stored item.

10. The system of claim 1, where the placement circuitry is configured to determine the efficiency coefficient based on a feedback history generated using previous command inputs from a SCP control interface generated at a presentation layer of the SCP stack.

11. A method including:
at network interface circuitry:
receiving historical access data for a selected stored item; and
receiving volume metric data for the selected stored item;
at placement circuitry in data communication with the network interface circuitry, the placement circuitry executing a storage class placement (SCP) stack:
obtaining, via an input layer of the SCP stack, the historical access data, and the volume metric data;
processing, at the input layer, the historical access data and volume metric data to generate time-collated activity data over a historical analysis time-window;
storing, at a data-staging layer of the SCP stack, the time-collated activity data;
processing, at a transformation layer of the SCP stack, the time-collated activity data to generate defined-period summation data that includes a series of summations spanning the historical analysis time-window, the summations for durations equal to a defined-period;
storing, at the data-staging layer, the defined-period summation data;
accessing, at a prescriptive engine layer of the SCP stack, the defined-period summation data via a memory resource provided by the data-staging layer;
based on the defined-period summation data, determining, at the prescriptive engine layer, an efficiency coefficient for a storage class for the selected stored item;
based on the efficiency coefficient, performing a class determination whether to place the selected stored item within the storage class by comparing the efficiency coefficient to other efficiency coefficients for the selected stored item; and
based on the class determination, generating, at the prescriptive engine layer, an SCP token; and
sending, via network interface circuitry, the SCP token to a host interface configured to control storage class placement for at least the selected stored item.

12. The method of claim 11, where performing the class determination includes comparing the efficiency coefficient to a threshold.

13. The method of claim 11, where the selected stored item is associated with a storage identifier.

14. The method of claim 11, determining the efficiency coefficient includes iteratively analyzing, in accord with corresponding storage identifiers, defined-period summation data for multiple stored items including the selected stored item.

15. The method of claim 11, where determining the efficiency coefficient includes determining the efficiency coefficient based on a feedback history generated using previous command inputs from a SCP control interface generated at a presentation layer of the SCP stack.

16. A product including:
machine-readable media other than a transitory signal; and
instructions stored on the machine-readable media, the instructions configured to, when executed, cause a machine to:
at network interface circuitry:
receive historical access data for a selected stored item; and
receive volume metric data for the selected stored item;
at placement circuitry in data communication with the network interface circuitry, the placement circuitry executing a storage class placement (SCP) stack:
obtain, via an input layer of the SCP stack, the historical access data, and the volume metric data;
process, at the input layer, the historical access data and volume metric data to generate time-collated activity data over a historical analysis time-window;
store, at a data-staging layer of the SCP stack, the time-collated activity data;
process, at a transformation layer of the SCP stack, the time-collated activity data to generate defined-period summation data that includes a series of summations spanning the historical analysis time-window, the summations for durations equal to a defined-period;
store, at the data-staging layer, the defined-period summation data;

access, at a prescriptive engine layer of the SCP stack, the defined-period summation data via a memory resource provided by the data-staging layer;

based on the defined-period summation data, determine, at the prescriptive engine layer, an efficiency coefficient for a storage class for the selected stored item;

based on the efficiency coefficient, perform a class determination whether to place the selected stored item within the storage class by comparing the efficiency coefficient to other efficiency coefficients for the selected stored item; and based on the class determination, generate, at the prescriptive engine layer, an SCP token; and send, via network interface circuitry, the SCP token to a host interface configured to control storage class placement for at least the selected stored item.

17. The product of claim 16, where:
the instructions are further configured to cause the machine to, at a presentation layer of the SCP stack, generate a SCP control interface including a SCP-window presentation; and
the SCP-window presentation includes a selectable option to execute a placement selection.

18. The product of claim 17, where the placement selection is grouped within the SCP-window presentation with other placement selections each corresponding to efficiency coefficients within a pre-defined range.

19. The product of claim 17, where the SCP-window presentation further includes a selectable option to reject execution of the placement selection.

20. The product of claim 17, where the SCP-window presentation is configured to display multiple placement selections each with a corresponding efficiency coefficient for the selected stored item.

* * * * *